US009329591B2

(12) United States Patent
Balkenende et al.

(10) Patent No.: US 9,329,591 B2
(45) Date of Patent: May 3, 2016

(54) FEATURE GEOMETRY ASPECT RECOGNITION AND MACHINING

(71) Applicants: Theo Balkenende, Enschede (NL); Hans Scheerder, Almelo (NL); Alex Stienstra, Enschede (NL); Tom van 't Erve, Enschede (NL)

(72) Inventors: Theo Balkenende, Enschede (NL); Hans Scheerder, Almelo (NL); Alex Stienstra, Enschede (NL); Tom van 't Erve, Enschede (NL)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 338 days.

(21) Appl. No.: 13/903,495

(22) Filed: May 28, 2013

(65) Prior Publication Data

US 2014/0358269 A1    Dec. 4, 2014

(51) Int. Cl.
*G06F 19/00*    (2011.01)
*G05B 19/4097*    (2006.01)

(52) U.S. Cl.
CPC .. *G05B 19/4097* (2013.01); *G05B 2219/35012* (2013.01); *G05B 2219/35082* (2013.01); *G05B 2219/35086* (2013.01); *G05B 2219/35095* (2013.01); *Y02P 90/265* (2015.11)

(58) Field of Classification Search
CPC .......... G05B 19/4069; G05B 19/4097; G05B 19/4099; G06T 17/00; G06T 19/00
USPC ............................. 700/98, 117, 118, 159, 182
See application file for complete search history.

(56) References Cited

U.S. PATENT DOCUMENTS

| | | | | |
|---|---|---|---|---|
| 5,485,390 | A | * | 1/1996 | LeClair et al. ................ 700/182 |
| 5,822,206 | A | | 10/1998 | Sebastian et al. |
| 5,949,693 | A | * | 9/1999 | Tandler ............................ 703/1 |
| 6,112,133 | A | * | 8/2000 | Fishman ...................... 700/182 |
| 6,120,171 | A | * | 9/2000 | Shaikh ............................ 700/98 |
| 6,311,100 | B1 | * | 10/2001 | Sarma et al. .................. 700/190 |
| 6,401,004 | B1 | * | 6/2002 | Yamazaki et al. ............ 700/159 |
| 6,754,556 | B1 | * | 6/2004 | Landers et al. ............... 700/182 |
| 6,862,560 | B1 | * | 3/2005 | Edwards et al. .................. 703/7 |
| 6,907,313 | B2 | * | 6/2005 | Matthews et al. ............. 700/182 |

(Continued)

FOREIGN PATENT DOCUMENTS

WO    02/23293 A1    3/2002
WO    2004/068275 A2    8/2004

OTHER PUBLICATIONS

The latest NC programming automation technology for increasing part manufacturing efficiency; White Paper; by Siemens, copyright 2011 by Siemens Product Lifecycle Management Software Inc., 8 pages.*

(Continued)

*Primary Examiner* — Ronald Hartman, Jr.

(57) ABSTRACT

Various disclosed embodiments include methods, systems, and computer-readable media for managing feature geometry-aspect machining using a PLM data processing system. According to one embodiment, a method includes identifying a feature geometry in a graphical design. The method also includes identifying an aspect of the feature geometry. The aspect includes a subset of the feature geometry. The method further includes defining the feature geometry aspect based on a user-defined name. The method also includes associating one or more machining operations with the feature geometry aspect. Additionally, the method includes storing the one or more machining operations and the user-defined name in association with the feature geometry aspect.

11 Claims, 4 Drawing Sheets

(56) References Cited

U.S. PATENT DOCUMENTS

| | | | | |
|---|---|---|---|---|
| 7,058,472 | B2* | 6/2006 | Mathews et al. | 700/182 |
| 7,069,108 | B2* | 6/2006 | Saarela et al. | 700/193 |
| 7,099,737 | B2* | 8/2006 | Suh et al. | 700/174 |
| 7,099,804 | B2* | 8/2006 | Landers et al. | 703/1 |
| 7,330,771 | B2* | 2/2008 | Casu et al. | 700/98 |
| 8,005,567 | B2* | 8/2011 | Porter et al. | 700/182 |
| 8,489,224 | B2* | 7/2013 | Berman et al. | 700/181 |
| 2001/0000805 | A1 | 5/2001 | Kadono | |
| 2008/0306620 | A1* | 12/2008 | Mutscheller | 700/109 |
| 2012/0290122 | A1* | 11/2012 | Morfino et al. | 700/184 |

OTHER PUBLICATIONS

NX CAM, Maximizing the value of your machine tool; by Siemens, copyright 2010, 4 pages.*

ESPIRIT Knowledgebase; solution overview; by DP Technology; copyright 2011; 2 pages.*

NX CAM Feature-Based Machining Author Add-On; by Siemens; copyright 2011; 1 page.*

PCT Search Report dated Aug. 13, 2014, for Application No. PCT/US2014/038200. (10 pages).

* cited by examiner

FEATURE GEOMETRY ASPECT RECOGNITION AND MACHINING

TECHNICAL FIELD

The present disclosure is directed, in general, to computer-aided design ("CAD"), computer-aided visualization, computer-aided simulation, and computer-aided manufacturing ("CAM") systems, product data management systems ("PDM"), product lifecycle management ("PLM") systems, and similar systems that manage data for products and other items (individually and collectively, product lifecycle management systems ("PLM") systems).

BACKGROUND OF THE DISCLOSURE

PLM systems can provide users with helpful and intuitive views of systems, objects, topologies, and other items. For example, CAM systems allow programmers to design, create, and modify graphical designs of objects, such as a part for a product. Manufacturers can manufacture these objects in accordance with the graphical designs of objects using numerical control (NC) of machine tools. NC is the automation of machine tools using programmed commands. Using NC programming, programmers can specify the shape of the object, the operations to be performed, and the order of the operations performed to manufacture the object.

However, depending on the complexity of the object to be manufactured, NC programming can be time-intensive and complicated. Accordingly, there is a need to address one or more of the issues described above and possibly other issues.

SUMMARY OF THE DISCLOSURE

Various disclosed embodiments relate to systems and methods for feature geometry aspect recognition and machining.

Various embodiments include systems, methods, and mediums for managing feature geometry-aspect machining using a PLM data processing system. According to one embodiment, a method includes identifying a feature geometry in a graphical design. The method also includes identifying an aspect of the feature geometry. The aspect includes a subset of the feature geometry. The method further includes defining the feature geometry aspect based on a user-defined name. The method also includes associating one or more machining operations with the feature geometry aspect. Additionally, the method includes storing the one or more machining operations and the user-defined name in association with the feature geometry aspect.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged device. The numerous innovative teachings of the present application will be described with reference to exemplary non-limiting embodiments.

Disclosed embodiments recognize that predefined features can be identified in a graphical design of an object and manufactured into a part using machining operations specified by NC programming. Disclosed embodiments recognize that individual features may have aspects that may need to be machined differently. Disclosed embodiments also recognize that machining operations applied to a feature as a whole may not properly create all the aspects of the feature in the manufactured part. Disclosed embodiments further recognize that applying machining operations to a feature as a whole may limit the use of feature-based machining to a subset of feature types that can be completely programmed automatically or may require expensive and time consuming manual NC programming techniques.

Accordingly, disclosed embodiments, described herein, provide feature geometry aspect recognition and machining. Disclosed embodiments provide for definition and automated recognition of geometrical aspects within a feature. Disclosed embodiments further provide for association of particular machining operations to one or more recognized aspects within a feature.

Figure 1:
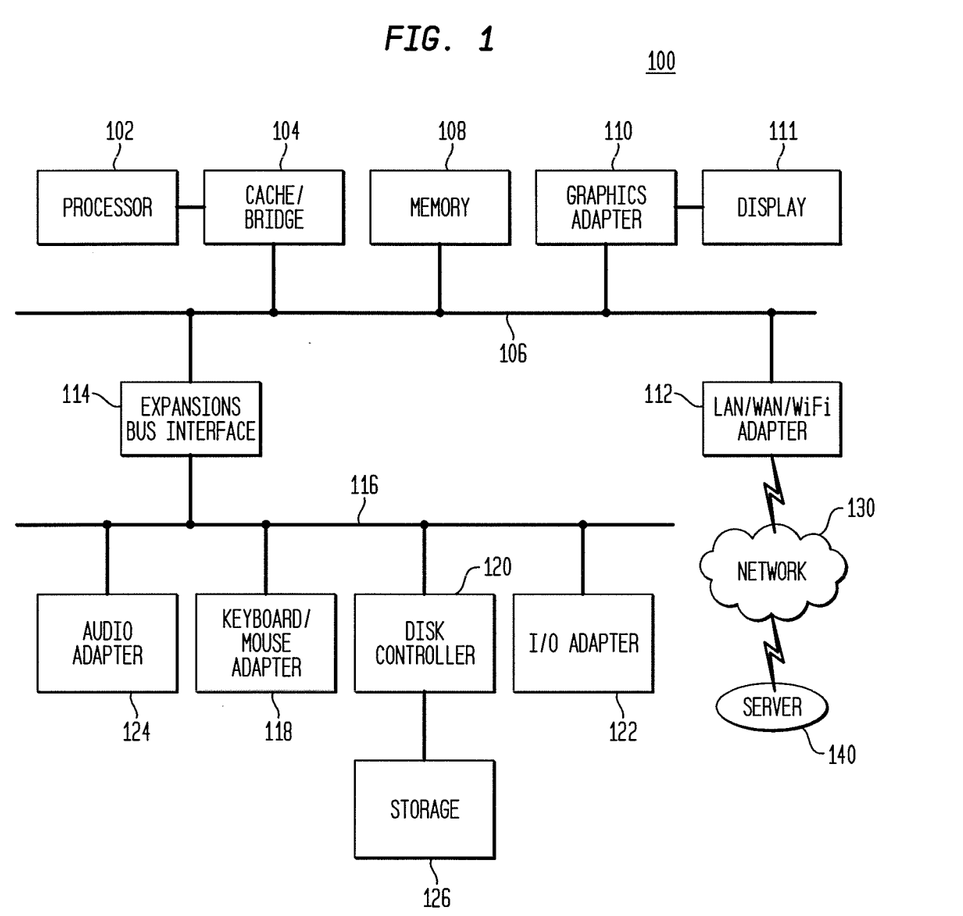
FIG. 1 illustrates a block diagram of a data processing system in which an embodiment can be implemented.

FIG. 1 illustrates a block diagram of a data processing system 100 in which an embodiment can be implemented, for example, as a PLM system or a CAM system particularly configured by software or otherwise to perform the processes as described herein, and, in particular, as each one of a plurality of interconnected and communicating systems as described herein. The data processing system 100 illustrated includes a processor 102 connected to a level two cache/bridge 104, which is connected in turn to a local system bus 106. Local system bus 106 may be, for example, a peripheral component interconnect (PCI) architecture bus. Also connected to local system bus 106 in the illustrated example are a main memory 108 and a graphics adapter 110. The graphics adapter 110 may be connected to display 111.

Other peripherals, such as local area network (LAN)/wide area network (WAN)/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs) and other known optical, electrical, or magnetic storage devices.

Also connected to I/O bus 116 in the example illustrated is audio adapter 124, to which speakers (not illustrated) may be connected for playing sounds. Keyboard/mouse adapter 118 provides a connection for a pointing device (not illustrated), such as a mouse, trackball, trackpointer, etc.

Those of ordinary skill in the art will appreciate that the hardware illustrated in FIG. 1 may vary for particular implementations. For example, other peripheral devices, such as an optical disk drive and the like, also may be used in addition to or in place of the hardware illustrated. The illustrated example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed by an event, such as clicking a mouse button, generated to actuate a desired response.

In various embodiments, the data processing system 100 is a CAM system having a CAM program executable by the data processing system 100. The data processing system 100 may display on display 111 one or more user interfaces for design, creation, modification, and manufacture of objects, such as a part for a product. For example, the data processing system 100 may generate NC programming for machine tools to machine the object in accordance with the design and manufacturing defined by the CAM system. The machine tools that perform the manufacture of the object (e.g., a computer numerical control (CNC) machine) may be connectable via network 130 or may have instructions loadable via a computer-readable media (e.g., flash memory, an optical disc, etc.) from the data processing system 100.

One of various commercial operating systems, such as a version of Microsoft Windows™, a product of Microsoft Corporation located in Redmond, Wash., may be employed if suitably modified. The operating system is modified or created in accordance with the present disclosure as described.

LAN/WAN/WiFi adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
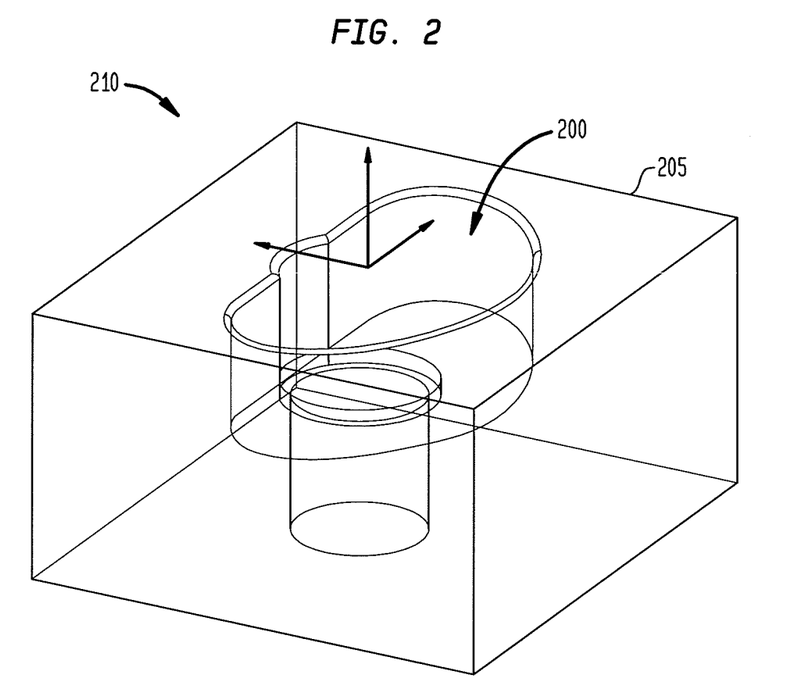
FIG. 2 illustrates a display of a feature of a graphical design in a user interface for a CAM system in accordance with disclosed embodiments.

FIG. 2 illustrates a display of a feature 200 of a graphical design 205 in a user interface 210 for a CAM system in accordance with disclosed embodiments. In this illustrative embodiment, user interface 210 is a user interface for a CAM system that is displayable on the display 111 in FIG. 1. Graphical design 205 is a design of an object to be manufactured using the CAM system. For example, the graphical design 205 may be a design of an object, such as a part that can be manufactured using NC programming and machine tools. The feature 200 is a shape or a set of recognizable geometric elements that are present within the graphical design 205. For example, in this illustrative embodiment, the graphical design 205 may be a design that may be for a part, such as a mold plate, that includes a hole for an ejector pin (e.g., feature 200) machined into the plate.

In this illustrative embodiment, the feature 200 is a machining feature 200, which is a feature that is machined into a larger object, such as a block. Machining features may be defined using one or more properties, such as of a name specifying the type of feature, a set of faces, a location within the object, an orientation of the feature relative to the object, and a series of attributes, such as feature dimensions (e.g., width, length, depth, etc.) and other relevant product manufacturing information, such as tolerances, thread, surface finish, etc.

Figure 3:
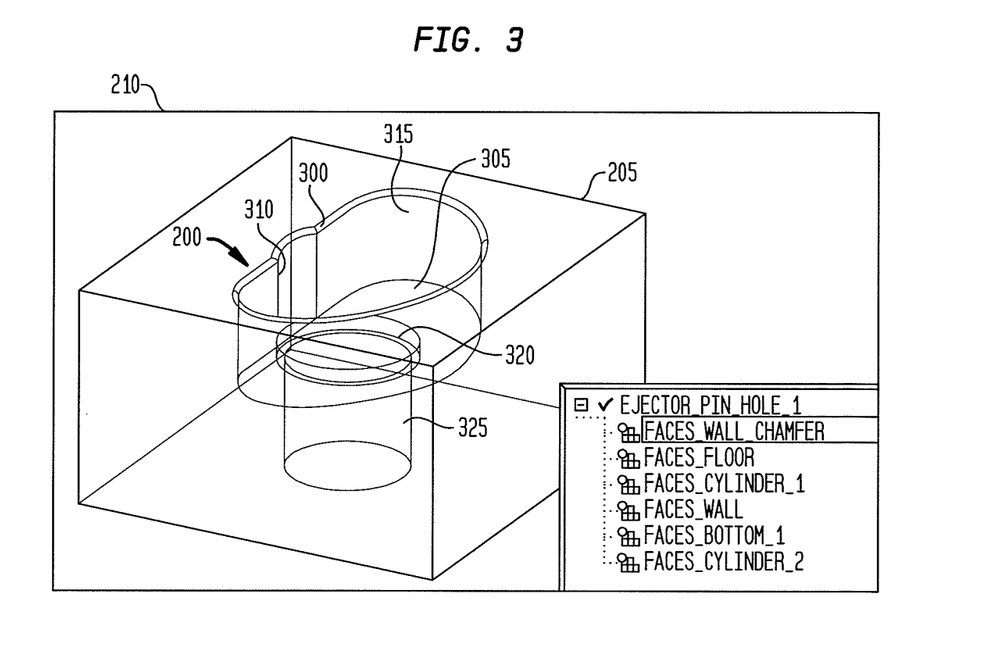
FIG. 3 illustrates a display of a feature geometry aspect in the feature illustrated in FIG. 2 in accordance with disclosed embodiments.

FIG. 3 illustrates a display of feature geometry aspect 300 in the feature 200 illustrated in FIG. 2 in accordance with disclosed embodiments. As illustrated, the feature 200 includes multiple aspects 300-325 that are defined within the feature 200. The present disclosure introduces the definition and automatic recognition of feature geometry aspects (i.e., aspects within the geometry of the larger feature). As used herein, a feature geometry aspect is a subset of the geometry of a feature. For example, the feature geometry aspect may be a subset of faces, edges, or points from a machining feature that can be identified using a unique and defined name. Each defined aspect may be further defined using one or more properties, such as a type or shape of the aspect, a set of faces included within the aspect, a location of the aspect within the feature or object, an orientation of the aspect relative to the feature or the object, and a series of attributes, such as aspect dimensions (e.g., width, length, depth, etc.) and other relevant product manufacturing information, such as tolerances, thread, surface finish, etc.

In this illustrative example, the machining feature 200, named "EJECTOR_PIN_HOLE_1", includes a defined exemplary feature geometry aspect 300 named "FACES_WALL_CHAMFER", which is highlighted in FIG. 3. Also in this illustrative example, the machining feature 200 includes other defined aspects within the feature 200 including aspect 305 named "FACES_FLOOR", aspect 310 named "FACES_CYLINDER_1", aspect 315 named "FACES_WALL", aspect 320 named "FACES_BOTTOM_1", and aspect 325 named "FACES_CYLINDER_2".

In various embodiments, programmers may define aspects within a feature using a teaching mode. For example, a programmer may label a subset of faces, edges, and/or points from the feature geometry as an aspect. The aspect may be defined by a name specifying or otherwise uniquely identifying the aspect, such as by type or shape of the aspect (e.g., chamfer, floor cylinder, wall, bottom, etc.). Once defined, the CAM system may store the name of the aspect as well as the properties of the aspect in a library of defined aspects. The library may be specific to a particular CAM system or may be shared among several systems in a network.

Figure 4:
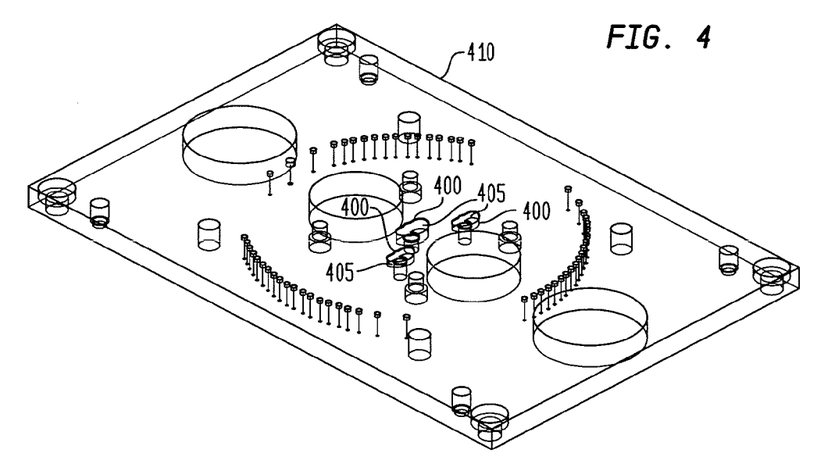
FIG. 4 illustrates a display of identified feature geometry aspects in features of a graphical design of a part in a user interface for a CAM system in accordance with disclosed embodiments.

FIG. 4 illustrates a display of identified feature geometry aspects 400 in features 405 of a graphical design of a part 410 in a user interface for a CAM system in accordance with disclosed embodiments. As illustrated, the aspect 400 in each of features 405 is selected and highlighted in the graphical design of a part 410. In this exemplary illustration, the aspects 400 may be examples of the feature geometry aspect 300 named "FACES_WALL_CHAMFER" in FIG. 3, and the features 405 may be examples of the hole for the ejector pin (e.g., feature 200 in FIG. 2) in the part 410, which may be, for example, a mold plate.

Upon definition of the aspect (e.g., the FACES_WALL_CHAMFER aspect 300), the CAM system can automatically recognize the defined aspect in any design in which the aspect is present. For example, the part 410 may include several of the same or similar features 405—each feature 405 including the same defined aspect. A programmer may select the defined aspect (e.g., from the library of aspects) and input a request for each instance of the selected aspect 400 in the presently displayed design to be automatically identified by the CAM system. Upon receiving the request input by the programmer, the CAM system automatically identifies each instance of the selected aspect 400 in the current design. For example, the CAM system may highlight each instance of the aspect 400 in the design. The CAM system automatically identifies each instance of the selected aspect 400 using the defined properties of the aspect. For example, the CAM system searches the features in the design of the part 410 for aspects 400 that match the defined properties of the selected aspect.

In various embodiments, the definition of feature geometry aspects improves manufacturing techniques. Using a defined feature geometry aspect, a programmer may input one or more machining operations that are specific to that feature geometry aspect as opposed to the feature as a whole. For example, a programmer may define, for each aspect, the set of machining operations, ordering of these operations, and parameters (e.g., machining strategy, cutting tool, drill depth, etc.) associated with the operation, that a machine will use to manufacture that aspect in the feature in the overall part. The CAM system permits the programmer to specify a subset of the overall geometry to be machined by restricting the geometry to be machined to a set of one or more of the defined feature aspects. For example, certain features (e.g., the ejector pin hole 200 in FIG. 2) have a complexity such that some machining operations may not be applied to the entire feature. For example, the programmer may want to only machine the upper hole (e.g., the FACES_CYLINDER_1 aspect 310). Given the complexity of the ejector pin hole 200, the CAM system may not be able to identify which part of the ejector pin hole 200 to mill if the machining operation were to be applied to the entire feature. Accordingly, embodiments of the present disclosure define feature geometry aspects and provide machining of specific aspects within the overall feature geometry.

Figure 5:
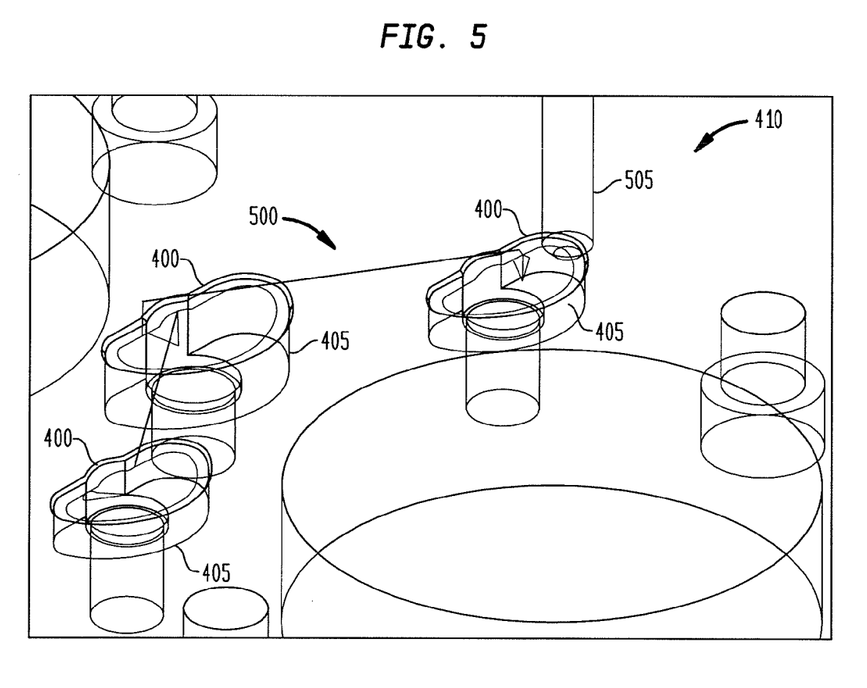
FIG. 5 illustrates a display of a machining operation for machining the identified feature geometry aspects in the features of the graphical design of the part illustrated in FIG. 4 in accordance with disclosed embodiments.

FIG. 5 illustrates a display of machining operations 500 for machining the identified feature geometry aspects 400 in the features 405 of the graphical design of the part 410 illustrated in FIG. 4 in accordance with disclosed embodiments. As illustrated, the CAM system generates a simulation of the machining operations 500 for a cutting tool 505 to machine the aspects 400 into the part 410. In this illustrative example, the machining operations 500 are chamfering operations to chamfer faces of the features 405 to machine the aspects 400 (e.g., the FACES_WALL_CHAMFER aspect 300) into the part 410. As illustrated, the cutting tool 505 (e.g., a chamfer mill in a CNC machine) chamfers around each of the top faces of the feature to machine the feature geometry aspect 400 into the part 410. The CAM system generates the simulation of the machining operations 500 illustrating the ordering of the operations 500. Additionally, the CAM system may identify and generate a simulation of other operations to machine other aspects of the features 405 into the part 410.

In various embodiments, the CAM system may, based on the geometry of the aspect, automatically identify the set of machining operations and the ordering to manufacture all the aspects in the feature. For example, the CAM system may evaluate a set of rules to automatically choose a set of machining operations to be performed and associated parameters for each operation. For example, the CAM system may identify programmer-defined operations and associated parameters specific to the aspect from, for example, a library of machining operations. For each instance of the aspect in the design, the CAM system may apply the set of operations to that design. Additionally, the CAM system may identify the operations based on the geometry of the aspect and the known capabilities of the machine and cutting tools (e.g., the operations the cutting tool can perform and the limitations or parameters on the performance of such operations).

In various embodiments, the CAM system may generate and output instructions in the form of numerical controls for machine tools to machine the multiple ejector pin holes into the actual physical part. In one illustrative embodiment, multiple ejector pin hole features may be machined according to the following set of operations (with each operation working on each of the features): a drilling operation where the geometry input is the FACES_CYLINDER_2 aspect 325; a hole milling operation where the geometry input is the "FACES_CYLINDER_1 aspect 310 and the FACES_BOTTOM_1 aspect 320; a pocket milling operation where the geometry input is the FACES_WALL aspect 315 and the FACES_FLOOR aspect 305; and a chamfering operation where the geometry input is the FACES_WALL_CHAMFER aspect 300.

The illustration of the ejector pin hole in the graphical design of the mold plate illustrated in FIGS. 2-5 is for the purpose of illustrating an example of features of the present disclosure and is not intended to imply any physical or architectural limitations in the various embodiments that can be implemented in accordance with the principals of the present disclosure. For example, embodiments of the present disclosure can be implemented in designs of products, features, and aspects other than the ones illustrated, including but not limited to parts, components, housings, molds, or objects. Additionally, embodiments of the present disclosure may be implemented in any type of design, visualization, simulation, or manufacturing system.

Figure 6:
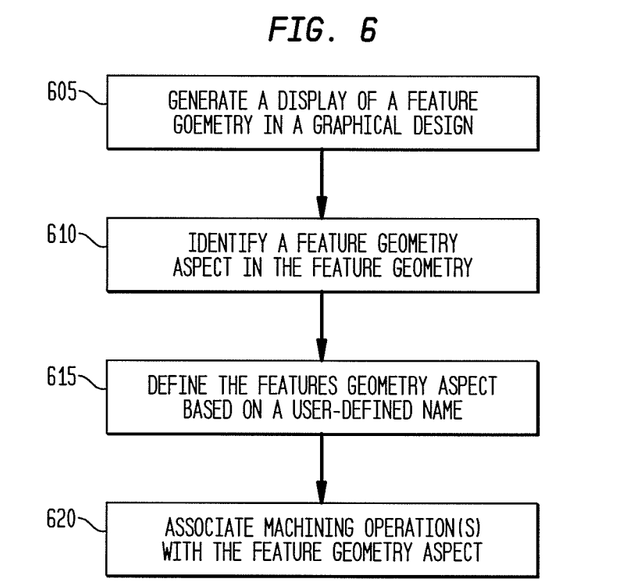
FIG. 6 illustrates a flowchart of a process for defining a feature geometry aspect in accordance with disclosed embodiments.

FIG. 6 illustrates a flowchart of a process for defining a feature and geometry aspects of the feature in accordance with disclosed embodiments. This process can be performed, for example, by one or more PLM data processing systems and/or one or more CAM data processing systems configured to perform acts described below, referred to in the singular as "the system." The process can be implemented by executable instructions stored in a non-transitory computer-readable medium that cause one or more PLM data processing systems to perform such a process. The process illustrated in FIG. 6 is an example of a process that may be performed by the data processing system 100 in FIG. 1.

The process begins with the system generating a display of a feature geometry in a graphical design (step 605). For example, as part of this step, the system may identify the part and display from a part file or receive user inputs designing the feature geometry. The system identifies a feature geometry aspect in the feature geometry (step 610). For example, as part of this step, the system may receive a user input selecting an aspect of the feature geometry, which may include a selection of one or more faces, one or more edges, and/or one or more points of the feature geometry.

The system defines the feature geometry aspect based on a user-defined name (step 615). For example, as part of this step, the system may receive a user input including the name for the feature geometry aspect. The system may then identify other properties of the geometry of the aspect, such as, for example, a type or shape of the aspect, a set of faces included within the aspect, a location of the aspect within the feature or object, an orientation of the aspect relative to the feature or the object, and a series of attributes, such as aspect dimensions (e.g., width, length, depth, etc.), and other relevant product manufacturing information, such as tolerances, thread, surface finish, etc. The system may then store the name and other properties of the aspect in a library of geometry aspects.

The system associates the machining operation(s) with the feature geometry aspect (step 620). For example, as part of this step, the system may receive an input of machining operation(s), an ordering of these operation(s), and/or parameters (e.g., machining strategy, cutting tool, drill depth, etc.) associated with the operation(s) used to machine the feature geometry aspect into the resultant part. These machining operation(s) may be associated with one or more of the aspects defined within the feature. The system may also store the set of machining operation(s) and associated properties of the operation(s) into the feature in a library of operations for the machining of the aspect. Additionally, for each aspect present within the feature, the system may return to steps 610 and 615 to continue to identify and define the aspects within the feature and then to step 615 to associate machining operations to machine the defined aspects.

Figure 7:
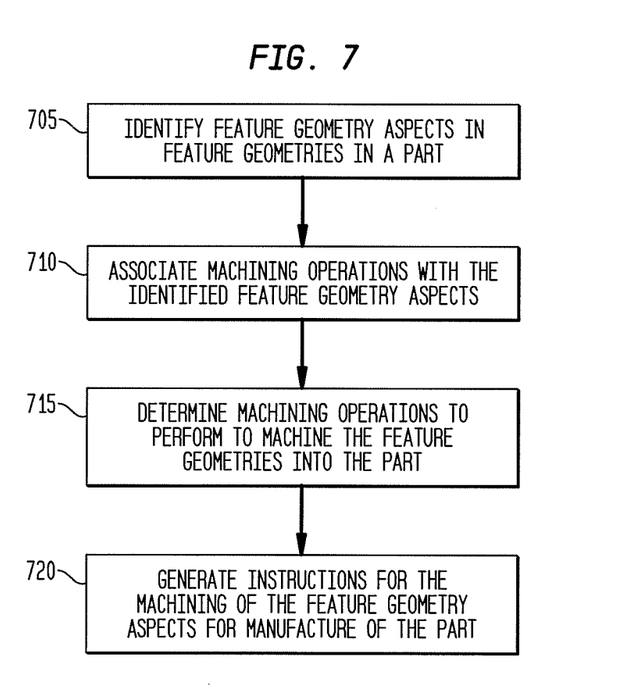
FIG. 7 illustrates a flowchart of a process for feature geometry aspect recognition and machining in accordance with disclosed embodiments.

FIG. 7 illustrates a flowchart of a process for feature geometry aspect recognition and machining in accordance with disclosed embodiments. This process can be performed, for example, by one or more PLM data processing systems and/or one or more CAM data processing systems configured to perform acts described below, referred to in the singular as "the system." The process can be implemented by executable instructions stored in a non-transitory computer-readable medium that cause one or more PLM data processing systems to perform such a process. The process illustrated in FIG. 7 is an example of a process that may be performed by the data processing system 100 in FIG. 1.

The process begins with the system identifying feature geometry aspects in feature geometries in a part (step 705). For example, as part of this step, the system may receive a request to identify each instance of a feature geometry aspect in a graphical design of the part that corresponds to a defined feature geometry aspect. For example, the defined feature geometry aspect may be stored in and selected from a library of geometries. The system may automatically identify each instance of the requested aspect in a displayed graphical design of the part.

The system associates machining operations with the identified feature geometry aspects (step 710). For example, as part of this step, the system may receive a request to generate a machining sequence to machine the aspect into the part. The system may automatically identify the operations to be applied to each of the identified aspects from a library of operations associated with the aspect.

The system determines machining operations to perform to machine the feature geometries into the part (step 715). For example, as part of this step, the system may identify the machining operations, an ordering of the operations, and/or parameters (e.g., machining strategy, cutting tool, drill depth, etc.) associated with the operations used to machine each of the feature geometry aspects into the features to form each of the features. For example, the system may determine the machining operations based on machining operations associated with defined feature geometry aspects included in each of the features. Additionally, for each aspect present within the feature, the system may return to steps 710 and 715 to continue to associate additional machining operations and to machine the additional machining operations.

The system generates instructions for the machining of the feature geometry aspects for manufacture of the part (step 720). For example, as part of this step, the system may generate a simulation of machining of the feature geometry aspect based on the machining operations, the ordering of the operations, and the parameters associated with the operations. Upon approval, the system may generate and output NC commands for the actual physical manufacture of the part by a machine.

Disclosed embodiments provide the definition and machining of a subset of the feature geometry. This ability provides increased flexibility and functionality for a programmer while adding controlled automation capabilities to programming for manufacturing. Disclosed embodiments allow the definition of machining features for detailed geometric complexity, while enabling the programmer to restrict the level of process automation required for any given part. In other words, the programmer knows what portion of the overall set of required operations can be automated for any given case. With geometries of even medium complexity, pre-defining all of the rules required to correctly automate the generation of the required machining operations may be time consuming and expensive. In certain applications, there are hundreds of parameters associated with the generation of machine tool paths and that may vary based upon part characteristics, such as material type, surface finish, and even the actual geometry itself, etc. By permitting the programmer to choose the right level of automation for any given part, embodiments of the present disclosure improve end user throughput, while reducing the end user cost for automation definition and utilization.

Additionally, embodiments of the present disclosure allow programmers to use feature-based machining on a larger set of their parts, especially those that contain complex feature types and require multiple operations each machining a different portion of the geometry of the feature. The automated feature geometry aspect selection provided by embodiments of the present disclosure reduces and/or eliminates the need for individual selection of feature geometry aspects and application of machining operations to particular features. Together, these features of the present disclosure reduce programming time and increase utilization of the automated manufacturing techniques.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal-bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for managing feature geometry-aspect machining using a data processing system, the method comprising:

through operation of at least one input device, receiving an input that identifies a feature geometry in a graphical design of a part;

through operation of the at least one input device, receiving an input that identifies a feature geometry aspect of the feature geometry, wherein the feature geometry aspect is a subset of the identified feature geometry;

through operation of the at least one input device, receiving an input that manually identifies a user-defined name for the feature geometry aspect;

through operation of at least one processor, automatically searching for and identifying at least one corresponding feature geometry aspect in each of a plurality of feature geometries in the graphical design of the part corresponding to the feature geometry aspect having the user-defined name;

through operation of the at least one processor, storing at least one operation referencing the user-defined name in association with one or more machining operations, through operation of the at least one processor, generating instructions for at least one machine tool to machine all of the feature geometry aspects manually identified and automatically identified with the user defined name based on the at least one operation that references the user-defined name.

2. The method of claim 1 further comprising:

through operation of the at least one processor, causing each instance of the feature geometry aspect that were manually and automatically identified to be visually highlighted in a user interface relative to feature geometry that does not correspond to the feature geometry aspect.

3. The method of claim 2 further comprising:

through operation of the at least one processor, generating via the user interface a simulation of machining of the feature geometry aspects based on the generated instructions.

4. The method of claim 1, wherein the feature geometry aspect includes at least one of one or more faces, one or more edges, or one or more points of the feature geometry.

5. A data processing system for managing feature geometry-aspect machining, the data processing system comprising:

at least one input device;

at least one processor; and a memory connected to the processor, the data processing system particularly configured to:

through operation of the at least one input device, receive an input that identifies a feature geometry in a graphical design of a part;

through operation of the input device, receive an input that identifies a feature geometry aspect of the feature geometry, wherein the feature geometry aspect is a subset of the identified feature geometry;

through operation of the input device, receive an input that manually identifies a user-defined name for the feature geometry aspect;

through operation of at least one processor, automatically search for and identifying at least one corresponding feature geometry aspect in each of a plurality of feature geometries in the graphical design of the part corresponding to the feature geometry aspect having the user-defined name;

through operation of the at least one processor, store at least one operation referencing the user-defined name in association with the one or more machining operations;

through operation of the at least one processor, generate instructions for at least one machine tool to machine all of the feature geometry aspects manually identified and automatically identified with the user defined name based on the at least one operation that references the user-defined name.

6. The data processing system of claim 5, wherein the data processing system is further configured to:

through operation of the at least one processor, cause each instance of the feature geometry aspect that were manually and automatically identified to be visually highlighted in a user interface relative to feature geometry that does not correspond to the feature geometry aspect.

7. The data processing system of claim 6, wherein the data processing system is further configured to:

through operation of the at least one processor, generate via the user interface a simulation of machining of the feature geometry aspects based on the generated instructions.

8. The data processing system of claim 5, wherein the feature geometry aspect includes at least one of one or more faces, one or more edges, or one or more points of the feature geometry.

9. A non-transitory computer-readable medium encoded with executable instructions for managing feature geometry-aspect machining that, when executed, cause at least one data processing system to:

through operation of the at least one input device, receive an input that identifies a feature geometry in a graphical design of a part;

through operation of the input device, receive an input that identifies a feature geometry aspect of the feature geometry, wherein the feature geometry aspect is a subset of the identified feature geometry;

through operation of the input device, receive an input that manually identifies a user-defined name for the feature geometry aspect;

through operation of at least one processor, automatically search for and identifying at least one corresponding feature geometry aspect in each of a plurality of feature geometries in the graphical design of the part corresponding to the feature geometry aspect having the user-defined name;

through operation of the at least one processor, store at least one operation referencing the user-defined name in association with one or more machining operations;

through operation of the at least one processor, generate instructions for at least one machine tool to machine all of the feature geometry aspects manually identified and automatically identified with the user defined name based on the at least one operation that references the user-defined name.

10. The computer-readable medium of claim 9 further comprising instructions that cause the data processing system to:

through operation of the at least one processor, cause each instance of the feature geometry aspect that were manually and automatically identified to be visually highlighted in a user interface relative to feature geometry that does not correspond to the feature geometry aspect.

11. The computer-readable medium of claim 10 further comprising instructions that cause the data processing system to:

through operation of the at least one processor, generate via the user interface a simulation of machining of the feature geometry aspects based on the generated instructions.

* * * * *